US010663097B2

(12) United States Patent
Uchikawa

(10) Patent No.: US 10,663,097 B2
(45) Date of Patent: May 26, 2020

(54) ROTARY JOINT

(71) Applicant: HONDA MOTOR CO., LTD,
Minato-ku, Tokyo (JP)

(72) Inventor: Motoki Uchikawa, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 133 days.

(21) Appl. No.: 15/704,217

(22) Filed: Sep. 14, 2017

(65) Prior Publication Data
US 2018/0080588 A1    Mar. 22, 2018

(30) Foreign Application Priority Data

Sep. 20, 2016   (JP) ................................ 2016-182972

(51) Int. Cl.
F16L 27/08     (2006.01)
F16L 27/087    (2006.01)
F16L 39/04     (2006.01)

(52) U.S. Cl.
CPC ......... F16L 27/0849 (2013.01); F16L 27/087 (2013.01); F16L 39/04 (2013.01); *F16L 27/0804* (2013.01)

(58) Field of Classification Search
CPC . F16L 27/0849; F16L 27/087; F16L 27/0804; F16L 39/04
USPC .......... 285/121.3, 148.4, 272, 273, 275, 278
See application file for complete search history.

(56) References Cited

U.S. PATENT DOCUMENTS

| 5,462,083 A * | 10/1995 | Kaspar | .................. F16L 27/087 |
| 2002/0017785 A1 * | 2/2002 | Omiya | .................... F16L 39/04 |
| | | | 285/121.3 |
| 2005/0139270 A1 * | 6/2005 | Businaro | ................ F16L 27/087 |
| 2012/0263551 A1 * | 10/2012 | Ura | .......................... F16L 39/04 |
| | | | 285/121.3 X |
| 2014/0145429 A1 * | 5/2014 | Chung | ..................... F16L 39/04 |

FOREIGN PATENT DOCUMENTS

| CN | 101173730 | 5/2008 |
| JP | 01-024957 | 5/1989 |
| JP | 10-169866 | 6/1998 |
| JP | 2014-025268 | 2/2014 |

OTHER PUBLICATIONS

Chinese Office Action and Search Report for Chinese Patent Application No. 201710851918.0 dated Jan. 28, 2019.
Japanese Office Action for Japanese Patent Application No. 2016-182972 dated Oct. 29, 2019.

* cited by examiner

Primary Examiner — Zachary T Dragicevich
(74) Attorney, Agent, or Firm — Amin, Turocy & Watson, LLP

(57) ABSTRACT

First circumferential grooves (first compressed air supply grooves, first pressure oil supply grooves, and a first coolant supply groove) formed on a first sliding surface, and second circumferential grooves (second compressed air supply grooves, second pressure oil supply grooves, and a second coolant supply groove) formed on a second sliding surface are formed in a rotary joint to be opposite to each other when seen from a radial direction of the rotary joint. In one pair of the opposite first circumferential groove and second circumferential groove, a type and a use of a fluid flowing in the first circumferential groove is the same as a type and a use of a fluid flowing in the second circumferential groove.

3 Claims, 4 Drawing Sheets

ROTARY JOINT

CROSS-REFERENCE TO RELATED APPLICATION

This application is based upon and claims the benefit of priority from Japanese Patent Application No. 2016-182972 filed on Sep. 20, 2016, the contents of which are incorporated herein by reference.

BACKGROUND OF THE INVENTION

Field of the Invention

The present invention relates to a rotary joint that is formed by combining a first member and a second member with each other to dispose a columnar portion of the second member inside a cylindrical portion of the first member.

Description of the Related Art

A rotary joint is a device that supplies or discharges a fluid to a rotating movable portion of each of various pieces of machinery without leaking the fluid, and is formed by combining two members (pipes) with each other that relatively rotate.

As disclosed in FIG. 5 of Japanese Patent Publication No. 01-024957, a conventional rotary joint is formed by combining with each other a cylindrical portion of a first member that is a fixing member, and a columnar portion (shaft) of a second member that is a rotation member. In this case, an outer circumferential surface of the shaft is partitioned by sealing members, and circumferential grooves are formed between the sealing members. Flow paths extend in an axial direction and communicate with the circumferential grooves in the shaft. Meanwhile, the flow paths and ports are formed in the cylindrical portion that fits to the shaft, and communicate with the circumferential grooves. Thus, the conventional rotary joint generally employs a one-stage configuration where the circumferential grooves are formed along an outer circumferential surface of the rotation member.

In recent years, rotary joints increasingly become necessary, and are demanded to supply or discharge various types of fluid such as air, coolants and pressure oils. In a case of the above one-stage configuration, by forming multiple circumferential grooves on the shaft and forming multiple flow paths and ports in the cylindrical portion to meet this demand, an entire length in the axial direction of the rotary joint increases. As a result, an area required for installing machinery needs to be large and is inconvenient.

To solve such a problem, FIG. 1 of Japanese Patent Publication No. 01-024957 discloses a rotary joint of a second-stage configuration in which a first member has a cylindrical portion (first cylindrical portion), a second member has a second cylindrical portion to fit to an outer circumferential surface of the first cylindrical portion, a bearing is formed on the first member and fits to an outer circumferential surface of the second cylindrical portion, other circumferential grooves are further formed on the outer circumferential surface of the second cylindrical portion, and flow paths extend in the axial direction in the second cylindrical portion and are connected with the other circumferential grooves. FIG. 1 of Japanese Laid-Open Patent Publication No. 2014-025268 also discloses a rotary joint of a two-stage configuration.

SUMMARY OF THE INVENTION

However, it is concerned that, in each of the rotary joints having the two-stage configuration disclosed in Japanese Patent Publication No. 01-024957 and Japanese Laid-Open Patent Publication No. 2014-025268, a pressure difference between fluids supplied to machinery strains a housing of the rotary joint and increases a sliding friction. That is, when seen from a radial direction of the rotary joint, a pressure difference between a fluid flowing in the circumferential grooves and the flow paths of the columnar portion of the second member, and a fluid flowing in the circumferential grooves and the flow paths of the second cylindrical portion of the second member causes distortion in the rotary joint.

To prevent occurrence of such distortion and secure sufficient rigidity, it is necessary to increase a size in the radial direction of the rotary joint. As a result, there is a problem that the rotary joint becomes large in the radial direction.

The present invention has been made by taking such a problem into account, and an object of the present invention is to provide a rotary joint that can shorten a length in a radial direction while securing rigidity.

A rotary joint according to the present invention includes a first member including a first cylindrical portion and a first flange portion formed at an end portion of the first cylindrical portion, and a second member including a second cylindrical portion arranged outside the first cylindrical portion, a columnar portion arranged inside the first cylindrical portion, and a second flange portion connecting an end portion of the second cylindrical portion and an end portion of the columnar portion, and the first member and the second member are combined with each other to arrange the first flange portion at one end portion and the second flange portion at another end portion.

To achieve the above object, the rotary joint includes the following characteristics.

That is, in the rotary joint, an outer circumferential surface of the first cylindrical portion and an inner circumferential surface of the second cylindrical portion are configured to form a first sliding surface where the first cylindrical portion and the second cylindrical portion are in sliding contact with each other, and an inner circumferential surface of the first cylindrical portion and an outer circumferential surface of the columnar portion are configured to form a second sliding surface where the first cylindrical portion and the columnar portion are in sliding contact with each other. In this case, a plurality of first circumferential grooves formed in a circumferential direction of the rotary joint are arranged on the first sliding surface along an axial direction of the rotary joint, and a plurality of second circumferential grooves formed in the circumferential direction are arranged on the second sliding surface along the axial direction. Further, each of the first circumferential grooves and each of the second circumferential grooves are opposite to each other when seen from a radial direction of the rotary joint, and when one of the first circumferential grooves and one of the second circumferential grooves are opposite to each other, a type and a use of a fluid flowing in the one first circumferential groove and a type and a use of a fluid flowing in the one second circumferential groove are configured to be same.

According to this configuration, the circumferential grooves used to supply the fluid to a rotating movable portion of machinery employs a two-stage configuration (the first circumferential grooves and the second circumferential grooves) when seen from the axial direction. Consequently, it is possible to shorten the length in the axial direction.

Further, the type and the use of the fluid flowing in the first circumferential grooves and the type and the use of the fluid flowing in the second circumferential grooves that are opposite to each other are the same. Consequently, pressures of the fluids on the first sliding surface and the second sliding surface become the substantially same. That is, when seen from the radial direction, the fluids are collected in each system of the same pressure to make the pressures of the fluid to be supplied equivalent. Thus, it is possible to prevent occurrence of displacement (distortion) caused when the first cylindrical portion is pulled from a portion of a high fluid pressure to a portion of a low fluid pressure, and reduce a sliding friction on the first sliding surface and the second sliding surface. As a result, it is possible to make the thicknesses of the first cylindrical portion and the second cylindrical portion thin while securing the rigidity of the rotary joint, and shorten the length in the radial direction.

A first fluid supply flow path is formed in the first cylindrical portion, extends in the axial direction, and communicates with the first circumferential grooves or the second circumferential grooves, a second fluid supply flow path is formed in the second cylindrical portion, extends in the axial direction, and communicates with the first circumferential grooves, and a third fluid supply flow path is formed in the columnar portion, extends in the axial direction, and communicates with the second circumferential grooves.

The types and the uses of the fluids flowing in the flow paths communicating with the opposite first and second circumferential grooves are the same. Consequently, a pressure difference between the fluids becomes substantially 0. Thus, it is possible to prevent distortion in the rotary joint, and reduce a sliding friction on the first sliding surface and the second sliding surface. As a result, it is possible to make the thicknesses of the first cylindrical portion and the second cylindrical portion thinner.

Each of the first circumferential grooves and each of the second circumferential grooves are partitioned per type of fluid and are arranged on the first sliding surface and the second sliding surface, respectively, and a type of fluid of a highest pressure among types of fluid flowing in each of the first circumferential grooves and each of the second circumferential grooves is a type of fluid flowing in the first circumferential groove and the second circumferential groove near the second flange portion.

The type of fluid flowing in the first circumferential groove and the second circumferential groove near the second flange portion is a type of higher pressure fluid than fluids flowing in the other circumferential grooves. Consequently, it is possible to keep shapes of flow paths (the second fluid supply flow paths and the third fluid supply flow paths) at coupling portions of the second flange portion with the columnar portion and the second cylindrical portion, and prevent the flow path from narrowing. Consequently, it is possible to reduce the sliding friction near the second flange portion. As a result, it is possible to make the thicknesses of the first cylindrical portion and the second cylindrical portion thinner, and shorten the length in the radial direction.

A pair of the first circumferential groove and the second circumferential groove and another pair of the first circumferential groove and the second circumferential groove may be arranged on the first sliding surface and the second sliding surface, and when the types and the uses of the fluids differ from each other, drain grooves opposite to each other when seen from the radial direction are formed between the one pair and the other pair, and a drain flow path communicating with each of the opposite drain grooves, and a discharge flow path extending in the axial direction and communicating with the drain flow path may be formed in the first cylindrical portion.

The drain grooves are formed to be opposite to each other between the pairs of the first circumferential groove and the second circumferential groove of different types and uses of the fluids. Therefore, even when deterioration or a tear of sealing portions between the circumferential grooves causes leakage of the fluid from the circumferential grooves, the fluid is discharged via each of the drain grooves, the drain flow path and the discharge flow path. As a result, it is possible to prevent the fluid from flowing in another neighboring circumferential groove and a flow path. Each of the drain grooves and the drain flow path are aggregated in the one discharge flow path. Consequently, it is possible to make the thickness of the first cylindrical portion thin, and make a size in the radial direction smaller.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a rotary joint according to the present invention will be exemplified and described with reference to the accompanying drawings.

Configuration of Present Embodiment

Figure 1:
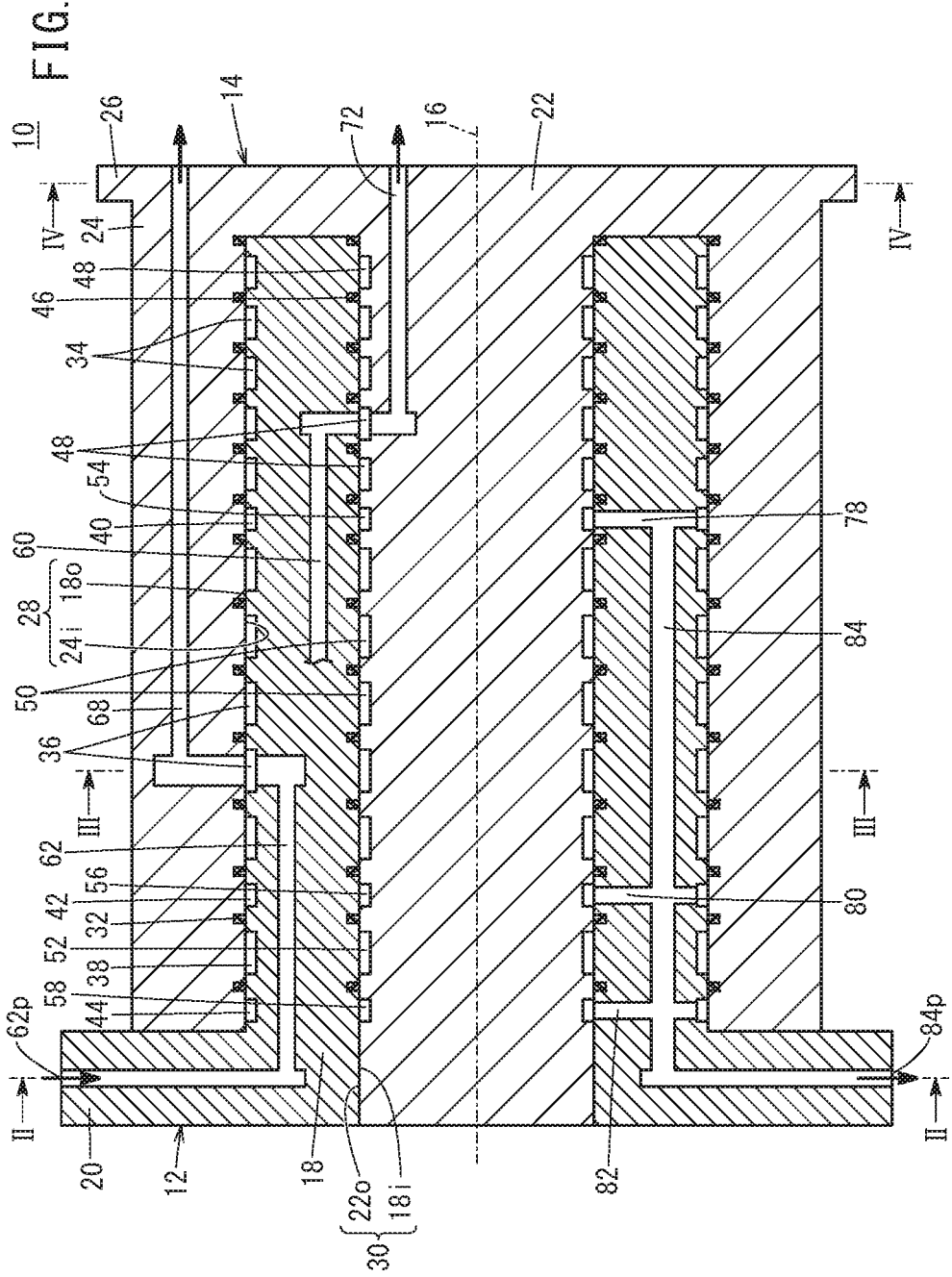
FIG. 1 is a cross-sectional view of a rotary joint according to one embodiment of the present invention.

FIG. 1 is a cross-sectional view of a rotary joint 10 according to one embodiment of the present invention.

The rotary joint 10 is a piping device that supplies or discharges a fluid to a rotating movable portion (e.g., a machining jig that forms a machine tool) of various types of machinery without leaking the fluid, and is formed by combining a first member 12 and a second member 14 with each other that are made of metal and relatively rotate.

The first member 12 includes a first cylindrical portion 18 that is substantially coaxial with a center axis 16 of the rotary joint 10, and a first flange portion 20 that protrudes from an end portion of the first cylindrical portion 18 (one end portion of the rotary joint 10) in a radial direction of the rotary joint 10.

The second member 14 includes a columnar portion 22 that is arranged inside the first cylindrical portion 18 and extends substantially coaxially with the center axis 16, a second cylindrical portion 24 that is arranged outside the first cylindrical portion 18 and extends substantially coaxially with the center axis 16, and a second flange portion 26 that connects the columnar portion 22 and an end portion of the second cylindrical portion 24 (another end of the rotary joint 10) and protrudes in the radial direction of the rotary joint 10.

In this case, an outer circumferential surface 18o of the first cylindrical portion 18 and an inner circumferential surface 24*i* of the second cylindrical portion 24 form a first sliding surface 28 (first sliding surface, or interface) where the first cylindrical portion 18 and the second cylindrical portion 24 are in sliding contact with each other. Meanwhile, an inner circumferential surface 18*i* of the first cylindrical portion 18 and an outer circumferential surface 22*o* of the columnar portion 22 form a second sliding surface 30 (second sliding surface, or interface) where the first cylindrical portion 18 and the columnar portion 22 are in sliding contact with each other. The first flange portion 20 and the columnar portion 22 are substantially flush with each other (form a flat surface) at one end portion of the rotary joint 10 when a distal end portion of the second cylindrical portion 24 comes into contact with the first flange portion 20.

At the first sliding surface 28, on the inner circumferential surface 24*i* of the second cylindrical portion 24, a plurality of first sealing members 32 are formed in a circumferential direction of the rotary joint 10 with respect to the center axis 16 and disposed along the center axis 16. Also, on the first sliding surface 28, on the outer circumferential surface 18*o* of the first cylindrical portion 18, first circumferential grooves are formed in the circumferential direction and disposed between the first sealing members 32.

More specifically, the plurality of first circumferential grooves disposed on the first sliding surface 28 are as follows. Five first compressed air supply grooves 34 are formed near the second flange portion 26, through which compressed air can flow. Five first pressure oil grooves 36 are formed at the center of the first sliding surface 28, through which a pressure oil can flow. One first coolant supply groove 38 is formed near the first flange portion 20, through which a coolant can flow.

One first drain groove 40 in the circumferential direction is formed between the five first compressed air supply grooves 34 and the five first pressure oil supply grooves 36, and also between the two first sealing members 32. One first drain groove 42 in the circumferential direction is formed between the five first pressure oil supply grooves 36 and the first coolant supply groove 38, and also between the two first sealing members 32. One first drain groove 44 in the circumferential direction is formed between the first flange portion 20 and the first sealing member 32 near the first flange portion 20 adjacent to the first coolant supply groove 38.

At the second sliding surface 30, on the inner circumferential surface 18*i* of the first cylindrical portion 18, a plurality of second sealing members 46 are formed in the circumferential direction and disposed along a direction of the center axis 16. In this case, when seen from the radial direction of the rotary joint 10, the plurality of second sealing members 46 are arranged oppositely to (or face toward) the first sealing members 32 arranged on the first sliding surface 28.

At the second sliding surface 30, on the outer circumferential surface 22*o* of the columnar portion 22, second circumferential grooves are formed in the circumferential direction and arranged between the second sealing members 46. The plurality of second circumferential grooves are formed oppositely to (or face toward) the plurality of first circumferential grooves when seen from the radial direction.

That is, the plurality of second circumferential grooves disposed on the second sliding surface 30 are as follows. Five second compressed air supply grooves 48, through which compressed air can flow, are formed near the second flange portion 26 oppositely to (or facing toward) the five first compressed air supply grooves 34. Five second pressure oil supply grooves 50, through which the pressure oil can flow, are formed at the center of the second sliding surface 30 oppositely to (or facing toward) the five first pressure oil supply grooves 36. One second coolant supply groove 52, through which the coolant can flow, is formed near the first flange portion 20 oppositely to (or facing toward) the one first coolant supply groove 38.

One second drain groove 54 in the circumferential direction is formed between the five second compressed air supply grooves 48 and the five second pressure oil supply grooves 50, and also between the two second sealing members 46, oppositely to (or facing toward) the first drain groove 40 when seen from the radial direction. One second drain groove 56 in the circumferential direction is arranged between the five second pressure oil supply grooves 50 and the second coolant supply groove 52, and also between the two second sealing members 46, oppositely to (or facing toward) the first drain groove 42 when seen from the radial direction. One second drain groove 58 in the circumferential direction is formed between the first flange portion 20 and the second sealing member 46 near the first flange portion 20 which is adjacent to the second coolant supply groove 52, oppositely to (or facing toward) the first drain groove 44 when seen from the radial direction.

Figure 2:
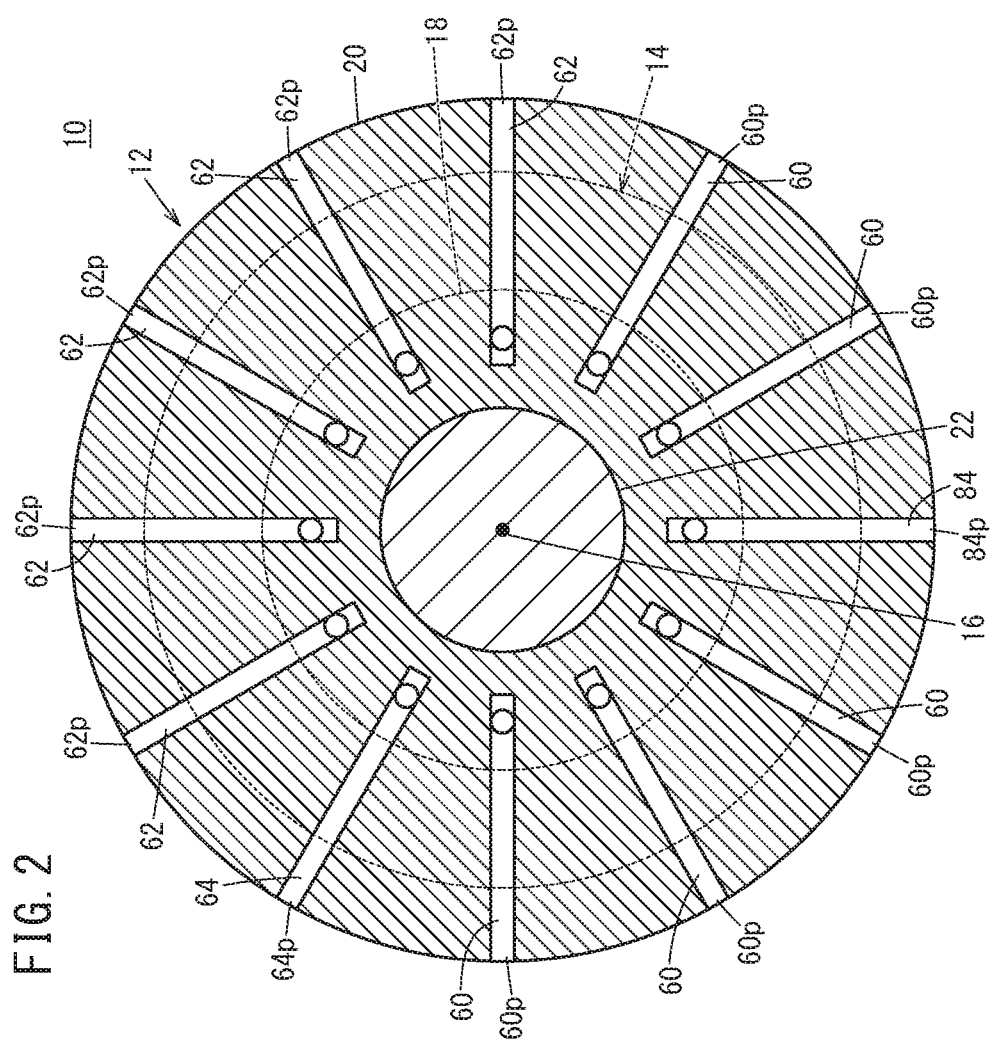
FIG. 2 is a cross-sectional view taken along a line II-II in FIG. 1.
Figure 3:
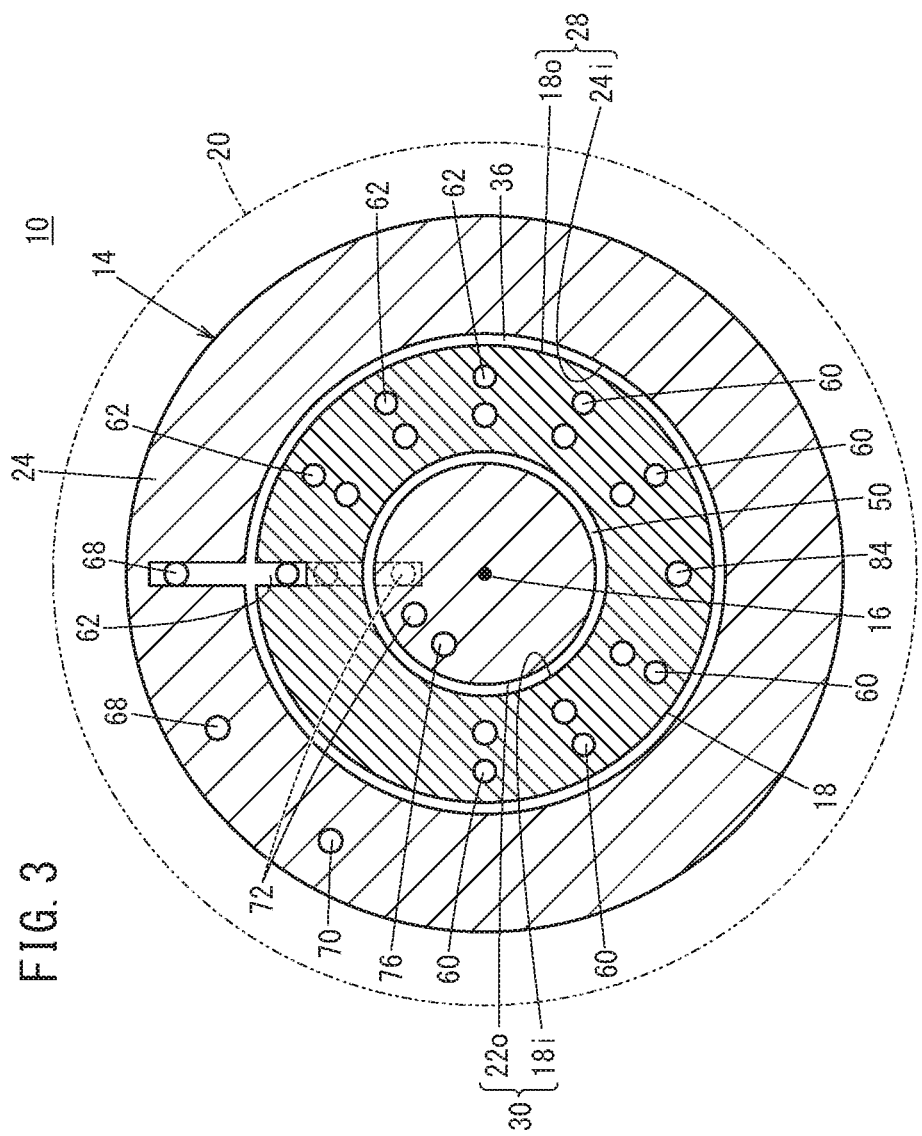
FIG. 3 is a cross-sectional view taken along a line III-III in FIG. 1.

As shown in FIGS. 1 to 3, a plurality of first fluid supply flow paths are formed in the first cylindrical portion 18, and extend in the direction of the center axis 16. The first fluid supply flow paths communicate with the first circumferential grooves (the first compressed air supply grooves 34, the first pressure oil supply grooves 36, and the first coolant supply groove 38) or the second circumferential grooves (the second compressed air supply grooves 48, the second pressure oil supply grooves 50, and the second coolant supply groove 52).

The plurality of first fluid supply flow paths are first compressed air supply paths 60 that supply compressed air to the first compressed air supply grooves 34 or the second compressed air supply grooves 48, first pressure oil supply paths 62 that supply the pressure oil to the first pressure oil supply grooves 36 or the second pressure oil supply grooves 50, and first coolant supply paths 64 that supply the coolant to the first coolant supply groove 38 or the second coolant supply groove 52.

In this case, the number of the first compressed air supply paths 60 corresponds to the number (ten) of the first compressed air supply grooves 34 and the second compressed air supply grooves 48. Each of the ten first compressed air supply paths 60 extends along the center axis 16 in the first cylindrical portion 18, and includes one end portion that forms a port 60*p* extending in the radial direction in the first flange portion 20 and communicating with the outside, and another end that extends in the radial direction in the first cylindrical portion 18 and communicates with one of the first compressed air supply grooves 34 and the second compressed air supply grooves 48.

The number of the first pressure oil supply paths 62 corresponds to the number (ten) of the first pressure oil supply grooves 36 and the second pressure oil supply grooves 50. Each of the ten first pressure oil supply paths 62 extends along the center axis 16 in the first cylindrical portion 18, and includes one end portion that forms a port 62*p* extending in the radial direction in the first flange portion 20 and communicating with the outside, and another end that extends in the radial direction in the first cylindrical portion 18 and communicates with one of the first pressure oil supply grooves 36 and the second pressure oil supply grooves 50.

The number of first coolant supply paths 64 corresponds to the number (two) of the first coolant supply groove 38 and the second coolant supply groove 52. Each of the two first coolant supply paths 64 extends along the center axis 16 in the first cylindrical portion 18, and includes one end portion that forms a port 64*p* extending in the radial direction in the first flange portion 20 and communicating with the outside, and another end portion that extends in the radial direction in the first cylindrical portion 18 and communicates with one of the first coolant supply groove 38 and the second coolant supply groove 52.

Figure 4:
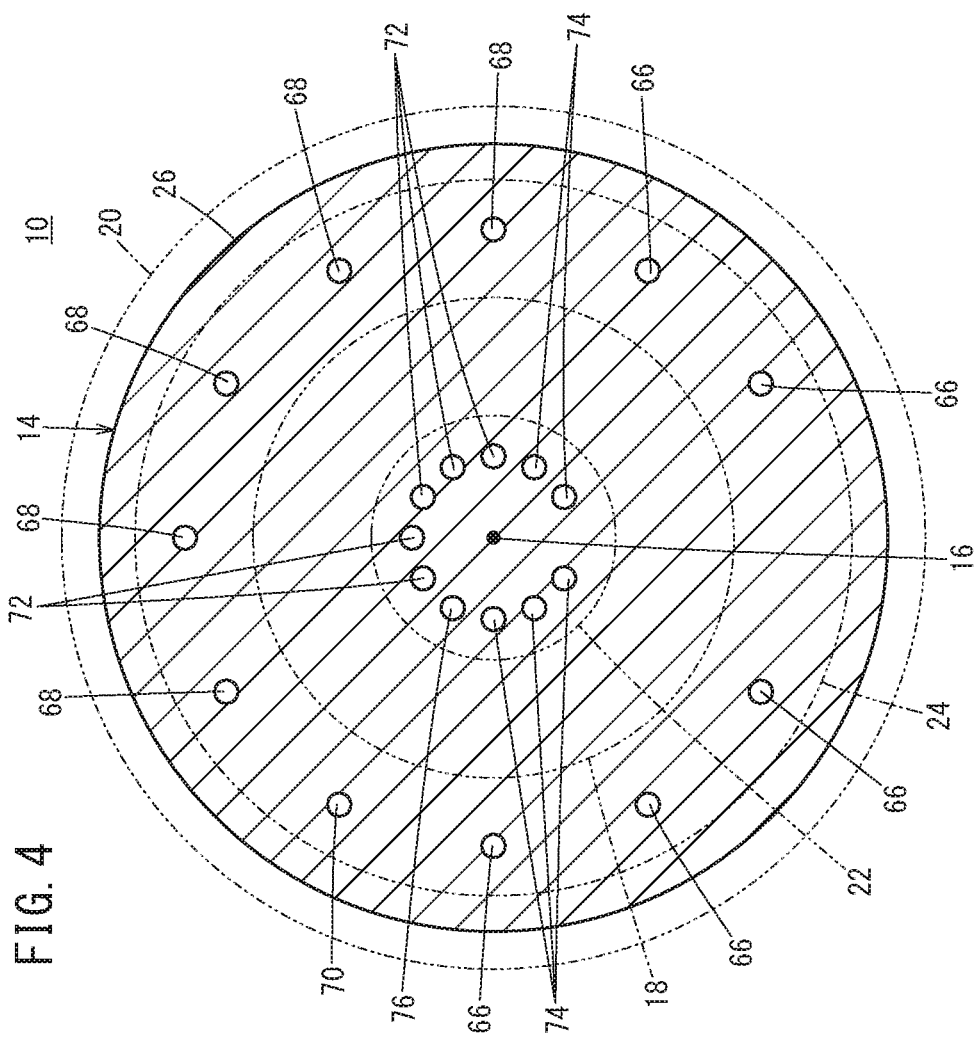
FIG. 4 is a cross-sectional view taken along a line IV-IV in FIG. 1.

As shown in FIGS. 1, 3 and 4, a plurality of second fluid supply flow paths are formed in the second cylindrical portion 24, and extend in the direction of the center axis 16. The second fluid supply flow paths communicate with the first circumferential grooves (the first compressed air supply paths 34, the first pressure oil supply grooves 36, and the first coolant supply groove 38) formed on the first sliding surface 28.

The plurality of second fluid supply paths are second compressed air supply paths 66 that communicate with the first compressed air supply grooves 34, second pressure oil supply paths 68 that communicate with the first pressure oil supply grooves 36, and a second coolant supply path 70 that communicates with the first coolant supply groove 38.

In this case, the number of the second compressed air supply paths 66 corresponds to the number (five) of the first compressed air supply grooves 34. Each of the five second compressed air supply paths 66 extends along the center axis 16 in the second cylindrical portion 24, and includes one end portion that extends in the radial direction in the second cylindrical portion 24 to communicate with one of the first compressed air supply grooves 34, and another end portion that communicates with the outside.

The number of the second pressure oil supply paths 68 corresponds to the number (five) of the first pressure oil supply grooves 36. Each of the five second pressure oil supply paths 68 extends along the center axis 16 in the second cylindrical portion 24, and includes one end portion that extends in the radial direction in the second cylindrical portion 24 and communicates with one of the first pressure oil supply grooves 36, and another end portion that communicates with the outside.

The second coolant supply path 70 extends along the center axis 16 in the second cylindrical portion 24, and includes one end portion that extends in the radial direction in the second cylindrical portion 24 and communicates with the first coolant supply groove 38, and another end portion that communicates with the outside.

As shown in FIGS. 1, 3 and 4, a plurality of third fluid supply flow paths are formed in the columnar portion 22, and extend in the direction of the center axis 16. The third fluid supply flow paths communicate with the second circumferential grooves (the second compressed air supply grooves 48, the second pressure oil supply grooves 50, and the second coolant supply groove 52) formed on the second sliding surface 30.

The plurality of third fluid supply flow paths are third compressed air supply paths 72 that communicate with the second compressed air supply grooves 48, third pressure oil supply paths 74 that communicate with the second pressure oil supply grooves 50, and a third coolant supply path 76 that communicates with the second coolant supply groove 52.

In this case, the number of the third compressed air supply paths 72 corresponds to the number (five) of the second compressed air supply grooves 48. Each of the five third compressed air supply paths 72 extends along the center axis 16 in the columnar portion 22, and includes one end portion that extends in the radial direction in the columnar portion 22 and communicates with one of the second compressed air supply grooves 48, and another end portion that communicates with the outside.

The number of the third pressure oil supply paths 74 corresponds to the number (five) of the second pressure oil supply grooves 50. Each of the plurality of third pressure oil supply paths 74 extends along the center axis 16 in the columnar portion 22, and includes one end portion that extends in the radial direction in the columnar portion 22 and communicates with one of the second pressure oil supply grooves 50, and another end portion that communicates with the outside.

The third coolant supply path 76 is arranged to meet the second coolant supply groove 52, extends along the center axis 16 in the columnar portion 22, and includes one end portion that extends in the radial direction in the columnar portion 22 and communicates with the second coolant supply groove 52, and another end portion that communicates with the outside.

Meanwhile, as shown in FIGS. 1 to 3, a plurality of drain flow paths 78 to 82 and a discharge flow path 84 are formed in the first cylindrical portion 18. The drain flow paths 78 to 82 communicate with the respective first drain grooves 40 to 44 and the respective second drain grooves 54 to 58 which are opposite to each other. The discharge flow path 84 extends in a direction of the center axis 16 and communicates with each of the drain flow paths 78 to 82. That is, the drain flow path 78 extends in the radial direction in the first cylindrical portion 18 to allow the first drain groove 40 and the second drain groove 54 to communicate with each other. A drain flow path 80 extends in the radial direction in the first cylindrical portion 18 for allow the first drain groove 42 and the second drain groove 56 to communicate with each other. The drain flow path 82 extends in the radial direction in the first cylindrical portion 18 to allow the first drain groove 44 and the second drain groove 58 to communicate with each other. The discharge flow path 84 extends in the direction of the center axis 16 in the first cylindrical portion 18, communicates with each of the drain flow paths 78 to 82, and includes one end portion that forms a port 84*p* extending in the radial direction in the first flange portion 20 and communicating with the outside, and another end portion that communicates with the drain flow path 78.

As a result, as shown in FIG. 2, in the first flange portion 20 of the rotary joint 10, the five first compressed air supply paths 60, the five first pressure oil supply paths 62, the one first coolant supply path 64 and one discharge flow path 84 are disposed radially extending at predetermined angle intervals around the center axis 16.

The number of the first circumferential grooves (the five first compressed air supply grooves 34, the five first pressure oil supply grooves 36, and the one first coolant supply groove 38) is eleven in total. The number of the second circumferential grooves (the five second compressed air supply grooves 48, the five second pressure oil supply grooves 50, and the one second coolant supply groove 52) is eleven in total. The number of the discharge flow path 84 is one. Hence, in the first flange portion 20, the eleven fluid supply paths (the five first compressed air supply paths 60, the five first pressure oil supply paths 62 and the one first coolant supply path 64) and the one discharge flow path 84 extend in the radial direction in the cross-sectional view at a position of FIG. 2. Meanwhile, although not shown, the rest of the eleven fluid supply paths extend in the radial direction in a cross-sectional view at another position.

As shown in FIGS. 3 and 4, the eleven second fluid supply flow paths (the five second compressed air supply paths 66, the five second pressure oil supply paths 68 and the one second coolant supply path 70) are disposed at predetermined angle intervals. The eleven third fluid supply flow paths (the five third compressed air supply paths 72, the five third pressure oil supply paths 74 and the one third coolant supply path 76) are disposed at predetermined angle intervals.

Operation of Present Embodiment

Next, the operation of the rotary joint 10 according to the present embodiment will be described with reference to FIGS. 1 to 4.

The rotary joint 10 is assembled in machinery such as a machine tool that is not shown, and supplies various fluids to a rotating movable portion of a machining jig or the like, or discharges the fluids.

That is, when the compressed air is supplied to the rotating movable portion with the rotary joint 10, the compressed air is supplied from the first compressed air supply paths 60 to the machinery via the first compressed air supply groove 34 and the second compressed air supply paths 66, or as shown in FIG. 1, from the first compressed air supply paths 60 to the machinery via the second compressed air supply grooves 48 and the third compressed air supply paths 72.

When the pressure oil is supplied to the rotating movable portion, as shown in FIG. 1, the pressure oil is supplied from the first pressure oil supply paths 62 to the machinery via the first pressure oil supply grooves 36 and the second pressure oil supply paths 68, or from the first pressure oil supply paths 62 to the machinery via the second pressure oil supply grooves 50 and the third pressure oil supply paths 74.

When the coolant is supplied to the rotating movable portion, the coolant is supplied from the first coolant supply path 64 to the machinery via the first coolant supply groove 38 and the second coolant supply path 70, or from the first coolant supply path 64 to the machinery via the second coolant supply groove 52 and the third coolant supply path 76.

In the rotary joint 10, when seen from the radial direction, the first circumferential grooves (the first compressed air supply grooves 34, the first pressure oil supply grooves 36, and the first coolant supply groove 38) and the second circumferential grooves (the second compressed air supply grooves 48, the second pressure oil supply grooves 50, and the second coolant supply groove 52) are opposite to each other. The two opposite first circumferential groove and second circumferential groove form a pair, and in the pair, the type and the use (purpose) of the fluid flowing in the first circumferential groove and the type and the use of the fluid flowing in the second circumferential groove are the same.

In FIG. 1, concerning one pair (two) of the opposite first compressed air supply groove 34 and second compressed air supply groove 48, compressed air is supplied to the rotating movable portion in order to, for example, closely adhere a work, load the work, check whether or not the work is clamped, unclamp the work or blow air to a seating surface of the work, by using a machining jig. The pressure of the compressed air through the first compressed air supply groove 34 is substantially the same as the pressure of the compressed air through the second compressed air supply groove 48. Concerning one pair (two) of the opposite first pressure oil supply groove 36 and second pressure oil supply groove 50, the pressure oil is supplied to the rotating movable portion in order to, for example, clamp the work, unclamp the work, elevate an ejector, or a lower the ejector, by using the machining jig. The pressure of the pressure oil through the first pressure oil supply groove 36 is substantially the same as the pressure of the pressure oil through the second pressure oil supply groove 50. Concerning one pair (two) of the opposite first coolant supply groove 38 and second coolant supply groove 52, the coolant is supplied to the rotating movable portion in order to cool the machining jig. The pressure of the coolant through the first coolant supply groove 38 is substantially the same as the pressure of the coolant through the second coolant supply groove 52.

A type of fluid having the highest pressure among the types of fluid flowing in the first circumferential grooves and the second circumferential grooves in the rotary joint 10 is a type of fluid flowing in the pair of the opposite first circumferential groove and second circumferential groove (the first compressed air supply groove 34 and the second compressed air supply groove 48) near the second flange portion 26. That is, the compressed air has the highest pressure, the pressure oil next, and the coolant the lowest.

The rotary joint 10 configured as described above can supply the fluid to one of the two rotating movable portions of the machinery via the first circumferential groove, and supply the fluid to the other rotating movable portion via the second circumferential grooves.

When deterioration or a tear of the first sealing members 32 and the second sealing members 46 causes leakage of the fluid flowing in the first circumferential grooves or the second circumferential grooves, the leaking fluid is discharged from the first drain grooves 40 to 44 and the second drain grooves 54 to 58 to the outside via the drain flow paths 78 to 82 and the discharge flow path 84 as shown in FIG. 1.

Effect of Present Embodiment

As described above, in the rotary joint 10 according to the present embodiment, the circumferential grooves used to supply the fluid to the rotating movable portions of the machinery employ the two-stage configuration (the first circumferential grooves and the second circumferential grooves) when seen from the direction of the center axis 16. Consequently, it is possible to shorten the length in the direction along the center axis 16 of the rotary joint 10.

Further, the types and the uses of the fluids flowing in the opposite first circumferential groove (the first compressed air supply groove 34, the first pressure oil supply groove 36 or the first coolant supply groove 38) and second circumferential groove (the second compressed air supply groove 48, the second pressure oil supply groove 50 or the second coolant supply groove 52) are the same. Consequently, the pressures of the fluids on the first sliding surface 28 and the second sliding surface 30 become the substantially same. That is, when seen from the radial direction of the rotary joint 10, the fluids are collected in each system of the same pressure to make the pressure of the fluid to be supplied equivalent.

Consequently, it is possible to prevent occurrence of displacement (distortion) caused when the first cylindrical portion 18 is pulled from a portion of a higher fluid pressure to a portion of a low pressure fluid, and reduce a sliding friction on the first sliding surface 28 and the second sliding surface 30. As a result, it is possible to make the thicknesses of the first cylindrical portion 18 and the second cylindrical portion 24 thin while securing the rigidity of the rotary joint 10, and shorten the length in the radial direction of the rotary joint 10.

In the present embodiment, concerning one pair of the opposite first circumferential groove and second circumferential groove, the types and the uses of the fluids flowing in the first fluid supply flow path (the first compressed air supply path 60, the first pressure oil supply path 62 and the first coolant supply path 64), the second fluid supply flow path (the second compressed air supply path 66, the second pressure oil supply path 68 and the second coolant supply path 70), and the third fluid supply flow path (the third compressed air supply path 72, the third pressure oil supply path 74 and the third coolant supply path 76) communicating with each other are the same. Consequently, a pressure difference between fluids in the pair of the opposite first circumferential groove and second circumferential groove becomes substantially 0. As a result, it is possible to prevent distortion in the rotary joint 10 and reduce the sliding friction on the first sliding surface 28 and the second sliding surface 30, and consequently make the thicknesses of the first cylindrical portion 18 and the second cylindrical portion 24 thinner.

In the present embodiment, the type of fluid (compressed air) flowing in the first circumferential groove (first compressed air supply groove 34) and the second circumferential groove (second compressed air supply groove 48) near the second flange portion 26 is the type of higher pressure fluid than the fluids (the pressure oil and the coolant) flowing in the other circumferential grooves (the first pressure oil supply groove 36, the first coolant supply groove 38, the second pressure oil supply groove 50, and the second coolant supply groove 52). Consequently, it is possible to keep the shapes of the flow paths (the second fluid supply flow path and the third fluid supply flow path) at coupling portions of the second flange portion 26, the columnar portion 22, and the second cylindrical portion 24, and prevent the flow paths from narrowing. Consequently, it is possible to reduce the sliding resistance near the second flange portion 26. As a result, it is possible to make the thicknesses of the first cylindrical portion 18 and the second cylindrical portion 24 thinner, and reduce the length in the radial direction of the rotary joint 10, too.

In the present embodiment, between the pairs of the first circumferential grooves and the second circumferential grooves of different types and uses of the fluids, i.e., between the pairs of the first compressed air supply grooves 34 and the second compressed air supply grooves 48 and the pairs of the first pressure oil supply grooves 36 and the second pressure oil supply grooves 50, and between the pairs of the first pressure oil supply grooves 36 and the second pressure oil supply grooves 50 and the pair of the first coolant supply groove 38 and the second coolant supply groove 52, the first drain grooves 40 to 44 and the second drain grooves 54 to 58 are formed oppositely to each other. Therefore, even when the deterioration or the tear of the first sealing members 32 or the second sealing members 46 causes leakage of the fluid from the first circumferential grooves or the second circumferential grooves, the leaked fluid is discharged to the outside via the first drain grooves 40 to 44, the second drain grooves 54 to 58, the drain flow paths 78 to 82, and the discharge flow path 84. As a result, it is possible to prevent the fluid from flowing in the other neighboring first circumferential grooves and second circumferential grooves and the other first to third fluid supply flow paths. The first drain grooves 40 to 44, the second drain grooves 54 to 58 and the drain flow paths 78 to 82 are aggregated to one discharge flow path 84. Consequently, it is possible to make the thickness of the first cylindrical portion 18 thin and make the size in the radial direction of the rotary joint 10 smaller.

Modification of Present Embodiment

The present invention is not limited to the above embodiment, and can naturally employ various configurations without departing from the gist of the present invention. The rotary joint 10 according to the present embodiment can employ, for example, following modifications (1) to (5).

(1) The number of respective circumferential grooves, the number of respective flow paths, the number of respective drain grooves, and the number of the respective drain flow paths inside the rotary joint 10 are not limited to the numbers in the above description and shown in FIGS. 1 to 4. Naturally, the numbers of the circumferential grooves, the flow paths, the drain grooves, and the drain flow paths may be changed optionally according to a type and a use of a fluid to be supplied to fluid supply destination machinery.

(2) In the above description, fluids supplied from the rotary joint 10 to the machinery are the compressed air, the pressure oil, and the coolant. In the present embodiment, it is also possible to supply other fluids according to specifications etc. of the machinery. Even in this case, as described above, a type of fluid flowing in the circumferential grooves and the flow paths near the second flange portion 26 is naturally a type of higher pressure fluid than fluids flowing in the other circumferential grooves and flow paths.

(3) In the above description, a case is referred to where the first sealing members 32 are arranged on the inner circumferential surface 24i of the second cylindrical portion 24 of the first sliding surface 28, and the first circumferential grooves are formed on the outer circumferential surface 18o of the first cylindrical portion 18. In the present embodiment, it is also possible to arrange the first sealing members 32 on the outer circumferential surface 18o of the first cylindrical portion 18, and form the first circumferential grooves on the inner circumferential surface 24i of the second cylindrical portion 24. Alternatively, it is also possible to arrange both of the first circumferential grooves and the first sealing members 32 on the outer circumferential surface 18o of the first cylindrical portion 18 or the inner circumferential surface 24i of the second cylindrical portion 24.

(4) In the above description, a case is referred to where the second sealing members 46 are arranged on the inner circumferential surface 18i of the first cylindrical portion 18 of the second sliding surface 30, and the second circumferential grooves are formed on the outer circumferential surface 22o of the columnar portion 22. In the present embodiment, it is also possible to arrange the second sealing members 46 on the outer circumferential surface 22o of the columnar portion 22, and form the second circumferential grooves on the inner circumferential surface 18i of the first cylindrical portion 18. Alternatively, it is also possible to arrange both of the second circumferential grooves and the second sealing members 46 on the outer circumferential surface 22o of the columnar portion 22 or the inner circumferential surface 18i of the first cylindrical portion 18.

(5) In the above description, a case is referred to where the respective flow paths and ports are formed in the radial direction in the first flange portion 20 seen from the cross-sectional view in FIG. 2 and the other cross-sectional view. In the present embodiment, it is also possible to employ a configuration to form all flow paths and ports in the radial direction seen from the cross-sectional view in FIG. 2.

What is claimed is:

1. A rotary joint comprising:
a first member including a first cylindrical portion and a first flange portion formed at an end portion of the first cylindrical portion; and
a second member including a second cylindrical portion arranged outside the first cylindrical portion, a columnar portion arranged inside the first cylindrical portion, and a second flange portion connecting an end portion of the second cylindrical portion and an end portion of the columnar portion,
wherein:
the first member and the second member are combined with each other to arrange the first flange portion at one end portion and the second flange portion at another end portion;
an outer circumferential surface of the first cylindrical portion and an inner circumferential surface of the second cylindrical portion are configured to form a first sliding surface where the first cylindrical portion and the second cylindrical portion are in sliding contact with each other;
an inner circumferential surface of the first cylindrical portion and an outer circumferential surface of the columnar portion are configured to form a second sliding surface where the first cylindrical portion and the columnar portion are in sliding contact with each other;
a plurality of first circumferential grooves formed in a circumferential direction of the rotary joint are arranged on the first sliding surface along an axial direction of the rotary joint;
a plurality of second circumferential grooves formed in the circumferential direction are arranged on the second sliding surface along the axial direction;
each of the plurality of first circumferential grooves and each of the plurality of second circumferential grooves are opposite to each other when seen from a radial direction of the rotary joint; and
when a first groove of the plurality of first circumferential grooves and a first groove of the plurality of second circumferential grooves are opposite to each other, a type and a use of a fluid flowing in the first groove of the plurality of first circumferential grooves and a type and a use of a fluid flowing in the first groove of the plurality of second circumferential grooves are configured to be same type and use, wherein
a first fluid supply flow path is formed in the first cylindrical portion, extends in the axial direction, and communicates with the plurality of first circumferential grooves or the plurality of second circumferential grooves;
a second fluid supply flow path is formed in the second cylindrical portion, extends in the axial direction, and communicates with the plurality of first circumferential grooves; and
a third fluid supply flow path is formed in the columnar portion, extends in the axial direction, and communicates with the plurality of second circumferential grooves, wherein
each of the plurality of first circumferential grooves and each of the plurality of second circumferential grooves are partitioned per type of fluid and are arranged on the first sliding surface and the second sliding surface, respectively;
a highest-pressure fluid among types of fluid flowing in the plurality of first circumferential grooves and types of fluid flowing in the plurality of second circumferential grooves flows in the first groove of the plurality of first circumferential grooves and in the first groove of the plurality of second circumferential grooves;
the first groove of the plurality of first circumferential grooves is near the second flange portion and the first groove of the plurality of second circumferential grooves is near the second flange portion; and
the plurality of first circumferential grooves comprises a first compressed air supply groove, a first pressure oil supply groove and a first coolant supply groove.

2. A rotary joint comprising:
a first member including a first cylindrical portion and a first flange portion formed at an end portion of the first cylindrical portion; and
a second member including a second cylindrical portion arranged outside the first cylindrical portion, a columnar portion arranged inside the first cylindrical portion, and a second flange portion connecting an end portion of the second cylindrical portion and an end portion of the columnar portion,
wherein:
the first member and the second member are combined with each other to arrange the first flange portion at one end portion and the second flange portion at another end portion;
an outer circumferential surface of the first cylindrical portion and an inner circumferential surface of the second cylindrical portion are configured to form a first sliding surface where the first cylindrical portion and the second cylindrical portion are in sliding contact with each other;
an inner circumferential surface of the first cylindrical portion and an outer circumferential surface of the columnar portion are configured to form a second sliding surface where the first cylindrical portion and the columnar portion are in sliding contact with each other;
a plurality of first circumferential grooves formed in a circumferential direction of the rotary joint are arranged on the first sliding surface along an axial direction of the rotary joint;
a plurality of second circumferential grooves formed in the circumferential direction are arranged on the second sliding surface along the axial direction;
each of the plurality of first circumferential grooves and each of the plurality of second circumferential grooves are opposite to each other when seen from a radial direction of the rotary joint; and
when a first groove of the plurality of first circumferential grooves and a first groove of the plurality of second circumferential grooves are opposite to each other, a type and a use of a fluid flowing in the first groove of the plurality of first circumferential grooves and a type and a use of a fluid flowing in the first groove of the plurality of second circumferential grooves are configured to be same type and use, wherein
a first fluid supply flow path is formed in the first cylindrical portion, extends in the axial direction, and communicates with the plurality of first circumferential grooves or the plurality of second circumferential grooves;
a second fluid supply flow path is formed in the second cylindrical portion, extends in the axial direction, and communicates with the plurality of first circumferential grooves; and a third fluid supply flow path is formed in the columnar portion, extends in the axial direction, and communicates with the plurality of second circumferential grooves, wherein each of the plurality of first circumferential grooves and each of the plurality of second circumferential grooves are partitioned per type of fluid and are arranged on the first sliding surface and the second sliding surface, respectively;

a highest-pressure fluid among types of fluid flowing in the plurality of first circumferential grooves and types of fluid flowing in the plurality of second circumferential grooves flows in the first groove of the plurality of first circumferential grooves and in the first groove of the plurality of second circumferential grooves;

the first groove of the plurality of first circumferential grooves is near the second flange portion and the first groove of the plurality of second circumferential grooves is near the second flange portion; and the plurality of second circumferential grooves comprises a second compressed air supply groove, a second pressure oil supply groove and a second coolant supply groove.

3. A rotary joint comprising:

a first member including a first cylindrical portion and a first flange portion formed at an end portion of the first cylindrical portion; and a second member including a second cylindrical portion arranged outside the first cylindrical portion, a columnar portion arranged inside the first cylindrical portion, and a second flange portion connecting an end portion of the second cylindrical portion and an end portion of the columnar portion, wherein:

the first member and the second member are combined with each other to arrange the first flange portion at one end portion and the second flange portion at another end portion;

an outer circumferential surface of the first cylindrical portion and an inner circumferential surface of the second cylindrical portion are configured to form a first sliding surface where the first cylindrical portion and the second cylindrical portion are in sliding contact with each other;

an inner circumferential surface of the first cylindrical portion and an outer circumferential surface of the columnar portion are configured to form a second sliding surface where the first cylindrical portion and the columnar portion are in sliding contact with each other;

a plurality of first circumferential grooves formed in a circumferential direction of the rotary joint are arranged on the first sliding surface along an axial direction of the rotary joint;

a plurality of second circumferential grooves formed in the circumferential direction are arranged on the second sliding surface along the axial direction;

each of the plurality of first circumferential grooves and each of the plurality of second circumferential grooves are opposite to each other when seen from a radial direction of the rotary joint; and when a first groove of the plurality of first circumferential grooves and a first groove of the plurality of second circumferential grooves are opposite to each other, a type and a use of a fluid flowing in the first groove of the plurality of first circumferential grooves and a type and a use of a fluid flowing in the first groove of the plurality of second circumferential grooves are configured to be same type and use, wherein a first fluid supply flow path is formed in the first cylindrical portion, extends in the axial direction, and communicates with the plurality of first circumferential grooves or the plurality of second circumferential grooves;

a second fluid supply flow path is formed in the second cylindrical portion, extends in the axial direction, and communicates with the plurality of first circumferential grooves; and a third fluid supply flow path is formed in the columnar portion, extends in the axial direction, and communicates with the plurality of second circumferential grooves, wherein:

a first pair comprises the first groove of the plurality of first circumferential grooves and the first groove of the plurality of second circumferential grooves and a second pair comprises a second groove of the first plurality of circumferential grooves and a second groove of the second plurality of circumferential grooves, and when the types and the uses of the fluids of the first pair differs from the types and the uses of the fluids of the second pair, drain grooves opposite to each other when seen from the radial direction are formed between the first pair and the second pair; and a drain flow path communicating with each of the opposite drain grooves, and a discharge flow path extending in the axial direction and communicating with the drain flow path, are formed in the first cylindrical portion.

* * * * *